No. 628,286. Patented July 4, 1899.
F. SCHANZ.
PHOTOGRAPHIC LIGHT STAND.
(Application filed Nov. 12, 1898.)
(No Model.)
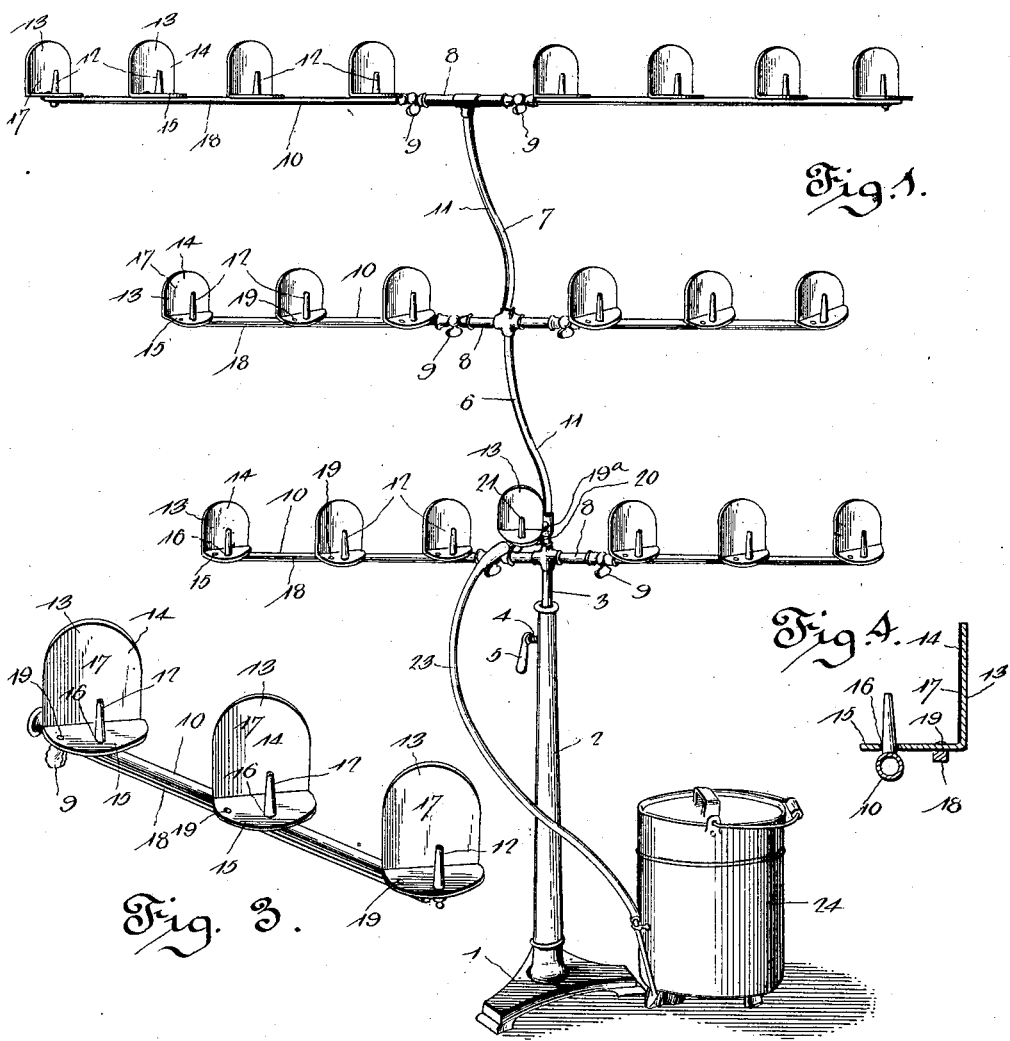
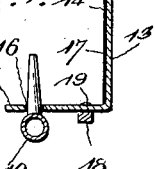
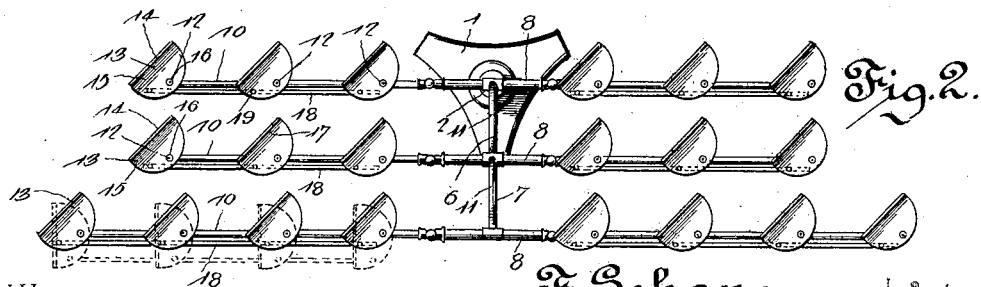
Witnesses  F. Schanz, Inventor.

UNITED STATES PATENT OFFICE.

FELIX SCHANZ, OF FORT WAYNE, INDIANA.

PHOTOGRAPHIC-LIGHT STAND.

SPECIFICATION forming part of Letters Patent No. 628,286, dated July 4, 1899.

Application filed November 12, 1898. Serial No. 696,289. (No model.)

*To all whom it may concern:*

Be it known that I, FELIX SCHANZ, a citizen of the United States, residing at Fort Wayne, in the county of Allen and State of Indiana, have invented a new and useful Photographic-Light Stand, of which the following is a specification.

This invention relates to an improved photographic-light stand designed for illuminating the subject to be photographed.

The main and primary object of the invention is to provide a new and useful construction of photographic-light stand especially adapted for use in connection with acetylene gas and having means for completely controlling the quantity, intensity, and shade effect of the light, so that a subject can be photographed under any condition of light and shade desired. With this end in view the invention, while displacing the ordinary flash-light apparatus, has a much wider range of use, as the same provides for a continuous light absolutely under the control of the photographer to place the desired light on the subject, while at the same time shielding or shading the lens of the camera from undue reflection.

With these and other objects in view, which will readily appear as the nature of the invention is better understood, the same consists in the novel construction, combination, and arrangement of parts hereinafter more fully described, illustrated, and claimed.

While the essential and characteristic features of the invention are necessarily susceptible of modification, still the preferred embodiment of the invention is illustrated in the accompanying drawings, in which—

Figure 1 is a perspective view of a photographic-light stand embodying the improvements contemplated by the present invention. Fig. 2 is a top plan view thereof, showing in dotted lines the axial adjustment of some of the light-shades. Fig. 3 is a detail in perspective of a section of one of the horizontal cross-pipes and the adjustable light-shades fitted thereto. Fig. 4 is a detail sectional view of one of the light-shades, showing its pivotal connection with the burner-jet supporting the same.

Referring to the accompanying drawings, the numeral 1 designates the base or rest of the apparatus, from which arises an upright tubular stand 2, the upper open end of which adjustably receives therein the vertically-adjustable supporting-rod 3, which is held fast in its adjusted position by means of the setscrew 4, mounted in one side of the standard near its upper end and preferably provided with a handle 5 for convenient manipulation.

The vertically-adjustable supporting-rod 3 of the stand has coupled onto its upper end a piping framework 6, which is made in any desired size, according to the required use of the stand, and this piping framework is preferably made of ordinary gas-piping and essentially comprises the main upright central distributing-pipe 7, provided at spaced intervals with horizontal oppositely-extending coupling branches 8, having controlling or stop cocks 9 therein, and the horizontal cross or burner pipes 10, coupled at their inner ends to the said branches 8. The cross or burner pipes 10 extend horizontally from opposite sides of the central upright distributing-pipe 7, and each pair of the alined pipes 10 constitutes what may be properly termed a "cross-pipe," as the same project from opposite sides of the distributing-pipe 7 and intersect therewith. The separate spaced cross-pipes are arranged in different horizontal planes one above the other, and in order to dispose these pipes in a step series in different vertical planes the portions of the central distributing-pipe 7 between the separate cross-pipes are formed with lateral offsets 11, as plainly illustrated in Fig. 1 of the drawings.

By reason of the specific construction of the piping framework 6 such framework necessarily covers a large light area, and the proper blending and gradation of the light is effected through the peculiar disposition of the cross-pipes 10 in different horizontal and vertical planes, and in carrying out this feature of the invention I preferably construct the uppermost cross-arm 10 of a greater length than the other cross-arms, as plainly illustrated in Fig. 2 of the drawings.

Each of the cross or burner pipes 10 is provided with a plurality of upwardly-disposed burner-jets 12, and each of these burner-jets supports for axial adjustment thereon an L-shaped light-shade 13. The light-shade 13 for each burner-jet 12 is formed with a vertical shield-plate 14, having bent at right angles from its lower edge a horizontal base-flange 15, provided therein with a pivot-opening 16, which receives therethrough the burner-jet 12, supporting the shade. By mounting each L-shaped shade in this manner the vertical shield-plate 14 thereof is disposed at one side of the vertical plane of the burner-jet and may be turned in an axial plane around said burner-jet in any direction to provide for shielding the lens of the camera from the light.

As the vertical shield-plate 14 of each shade will lie in a plane between the camera-lens and the burner-jet the side of said shield-plate next to or facing the burner-jet may be utilized for reflecting purposes, and to provide for this such side of the shield-plate of each shade is covered with white enamel or other equivalent reflecting-surface 17.

In order to facilitate the adjustment of all of the light-shades 13 on each section or member of the cross-pipe 10, such shades are connected together by a common connecting-rod 18, which rod is arranged parallel with the cross-pipe section and passes beneath and is pivotally connected, as at 19, to the horizontal base-flanges 15 of the several shades. By reason of thus connecting the several light-shades on each section of each cross-pipe 10 the adjustment or axial movement of one shade will provide for the corresponding or simultaneous adjustment of all the other shades coupled therewith. A proper adjustment of the light-shades on the different cross-pipes will provide for shielding the camera-lens from the light, while at the same time concentrating the light upon and around the subject to the very best possible advantage.

Near its lower end the central distributing-pipe 7 of the piping framework has coupled thereto a feed-pipe branch 19ª, provided with a cut-off cock 20, which serves to cut off the gas from the entire piping framework 6 when desired, and which is also provided in advance of the cut-off cock 20 with a single burner-jet 21, which may be used to light up the room when the gas is cut off from the piping framework. This burner-jet 21 is also fitted with one of the light-shades 13, previously described. At this point it may be observed that the stop-cocks 9 may be manipulated to cut off the gas from any one or more of the opposite sections of the cross-pipes 10, thereby enabling the photographer to control his light to any desired degree and also to produce almost any shade effect.

As the apparatus is especially designed to be used with acetylene or equivalent gas, giving a proper light for photographic purposes, the feed-pipe branch 19ª has fitted thereto a gas-supply tube 23, leading from a suitable acetylene-gas generator 24.

From the foregoing it is thought that the construction, operation, and many advantages of the herein-described light-stand will be readily apparent to those skilled in the art without further description, and it will be understood that any changes in the form, proportion, and the minor details of construction may be resorted to without departing from the principle or sacrificing any of the advantages of this invention.

Having thus described the invention, what is claimed, and desired to be secured by Letters Patent, is—

1. In a photographic-light stand, a piping framework consisting of a central upright distributing-pipe provided at intervals with oppositely-extending valved coupling branches, horizontal cross or burner pipes fitted to the oppositely-extending coupling branches and provided with a plurality of burner-jets, and a separate feed-pipe branch connected to said distributing-pipe and provided with a cut-off cock and a single burner-jet, substantially as set forth.

2. In a photographic-light stand, a piping framework consisting of a central upright distributing-tube provided at intervals with oppositely-extending valved coupling branches, horizontal cross or burner pipes fitted to the oppositely-extending coupling branches and provided with a plurality of burner-jets, the said distributing-pipe between the cross-pipes being laterally offset to dispose all of the cross-pipes in different vertical planes, and the uppermost of said cross-pipes being of greater length than the remaining pipes below, an L-shaped light-shade for each jet having a reflecting-surface on one face of its vertical member and provided in its horizontal member with a pivot-opening to receive the jet, a common connecting-rod pivotally attached to each series of shades for an adjustment of the latter in unison, and a separate feed-pipe branch connected to the said distributing-pipe and having a cut-off cock and a single burner-jet.

3. In a photographic-light stand, the piping provided with a plurality of spaced burner-jets, an L-shaped light-shade for each jet having a reflecting-surface on one face of its vertical member, and provided in its horizontal member with a pivot-opening receiving the burner-jet, and means for adjusting said light-shades in unison, substantially as set forth.

4. The combination of a gas-pipe provided with a plurality of spaced burner-jets, a plurality of light-shades adjustable with relation to said burner-jets, and means for adjusting all of said light-shades in unison, substantially as set forth.

5. The combination of a gas-pipe provided with a plurality of spaced burner-jets, an L-shaped light-shade for each jet having a reflecting-surface on one face of its vertical member, and provided in its horizontal member with a pivot-opening receiving the burner-jet, and a common connecting-rod pivotally connected with all of the shades to provide for the adjustment thereof in unison, substantially as set forth.

In testimony that I claim the foregoing as my own I have hereto affixed my signature in the presence of two witnesses.

FELIX SCHANZ.

Witnesses:
H. R. KUHNE,
C. W. KUHNE.